Jan. 21, 1969  S. KITRILAKIS  3,422,833
AUTOMATIC WATERING VALVE
Filed Feb. 6, 1967  Sheet 1 of 2

INVENTOR.
SOTIRIS KITRILAKIS
BY
James B. Tippey Jr.
ATTORNEY

United States Patent Office 3,422,833
Patented Jan. 21, 1969

3,422,833
AUTOMATIC WATERING VALVE
Sotiris Kitrilakis, Newton, Mass., assignor to Thermo Electron Engineering, Waltham, Mass., a corporation of Delaware
Filed Feb. 6, 1967, Ser. No. 614,256
U.S. Cl. 137—78         3 Claims
Int. Cl. F16k 17/36, 31/34

ABSTRACT OF THE DISCLOSURE

An automatic water sprinkling valve having a float enclosed within a water chamber with the chamber open to the atmosphere allowing normal evaporative processes to occur. Valvular mechanisms operative by the position of the float permitting the flow of line pressure to a distribution area for a predetermined time interval.

---

Figure 1:
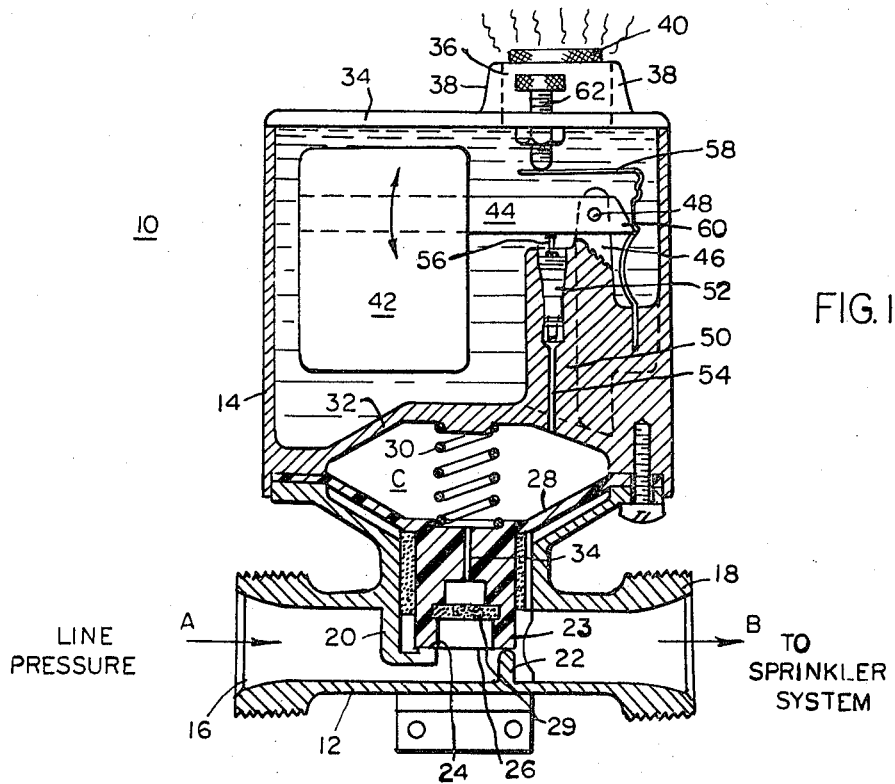

This invention relates generally to liquid control valves and in particular to a plant watering control device which will regulate a periodic supply of water based on a variable evaporation rates depending on the atmospheric conditions.

Various devices are now in use for commercial irrigation systems and a few are adaptable for home watering systems utilizing electronic controllers to sense the atmospheric conditions and to actuate the control valve. However, the majority of these devices are usually of a complicated structure and high basic cost. Simpler patented devices lack bi-stability and allow water to pass to the sprinkling head thereby gradually reducing the effectiveness of the watering cycle.

Therefore, it is an object of this invention to provide a new and improved water sprinkler control valve for operation at periodic intervals which interval is dependent upon natural rainfall and the invention is actuated by the atmospheric evaporation rate to maintain a regular and constant watering cycle.

It is another object of this invention to provide a water sprinkler control valve adapted for use with existing water sprinkling systems.

It is a further object of this invention to provide a water sprinkler control valve which is adjustable and the watering period may be varied over a prescribed range.

Other objects of this invention will in part be obvious and will in part appear hereinafter.

Broadly speaking the feature of this invention is to provide a water control sprinkling valve which is essentially contained within one integral housing adapted to be fitted between the water supply line and a sprinkler system. By providing access from the interior of the control valve to the atmosphere a prescribed amount of water contained within the water control valve will evaporate actuating the control device and allowing line pressure to be delivered to the water sprinkling system for a prescribed period of time.

To the accomplishment of this and the foregoing related ends, the present invention then consists of the means hereinafter fully described and particularly pointed out in the claims, the annexed drawings and the following description, setting forth in detail certain means in the carrying out of the invention, such disclosed means illustrating, however, but one of the various ways in which the principle of the invention may be employed.

Figure 2:
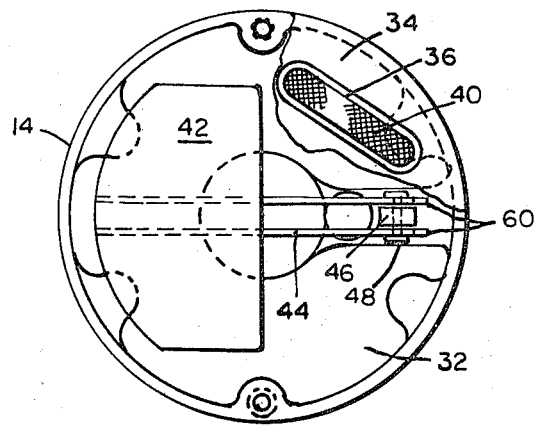
Figure 3:
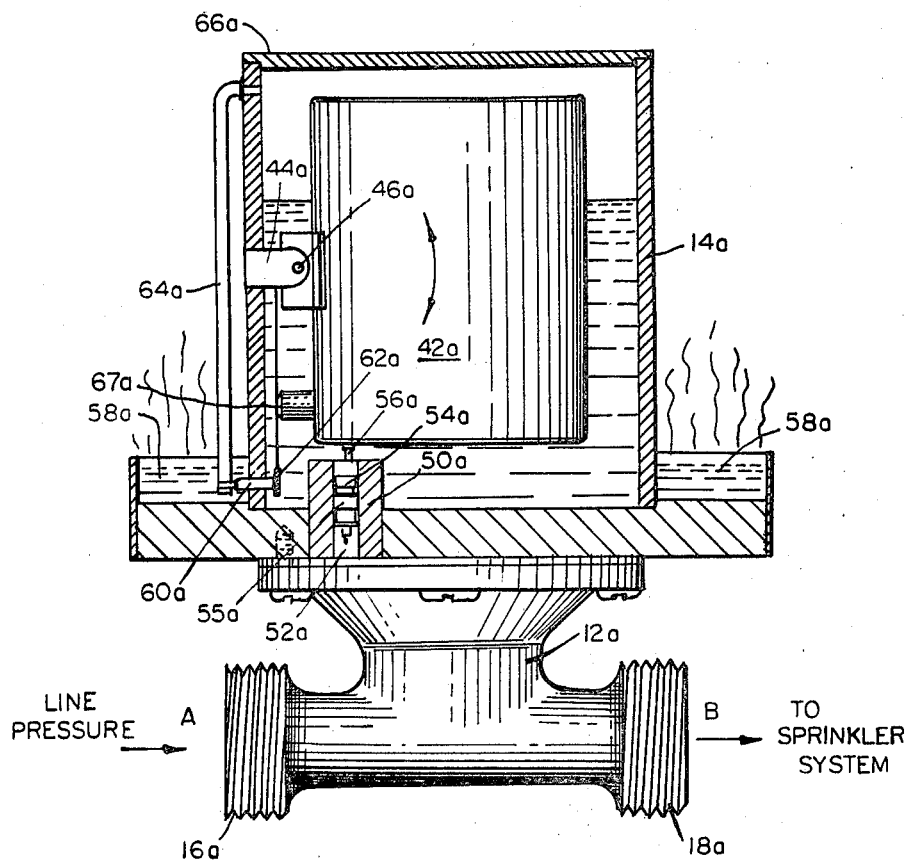

In the drawings:

FIG. 1 is a view in front elevation, partly in section of the water control valve, FIG. 2 is a top plan view of the invention, FIG. 3 is a view in front elevation, partly in section of a modified form of the invention.

Reference is now to be had to the drawings wherein a preferred embodiment of the water control valve, a construction made in accordance with the present invention and designated by the reference numeral 10 is shown. The valve 10 consists of a lower housing 12 and an upper housing 14. For purposes of simplicity each of these housings will be described in detail and there interrelationship set forth hereinafter. The lower housing 12 is a casting or the like having a threaded inlet 16 at one end thereof and threaded outlet 18 at the opposing end thereof. Disposed intermediate the inlet and the outlet are a pair of baffles 20 and 22 arranged so that they will interrupt the flow of water between the inlet and the outlet as is common in all stop valves. The baffles 20 and 22 are connected by a portion of the valve housing 23 and the continuity between the inlet and outlet is permitted only through a valve seat 24 disposed intermediate the baffles 20 and 22. Positioned in axial alignment with the valve seat 24 is a valve disc 26 and adapted for axial movement toward and away from the valve seat 24 and maintained normally in abutting relationship therewith by means of a resilient diaphragm 28 and a spring 30. A chamber C as shown in FIG. 1 which has an upper wall 32 forming the base of the upper housing 14 and the lower wall comprising the resilient diaphragm 28. The chamber C is maintained under line pressure by a capillary 34 which extends upwardly through the valve disc 26 connecting the inlet side of lower housing with the chamber C. A filter 29 is interposed between the capillary 34 and the line pressure to prevent the clogging of the capillary by impurities present in the water.

The upper housing 14 being a semi-closed container acts as a reservoir for the storage of water which essentially is the control of the operation of the valve. Extending through the top wall 34 of the upper housing 14 is a wall 36 having raised side walls 38. The wall 36 is directly connected to the interior of the housing 14 and contains a wick 40 extending downward into contact with the water.

Disposed within the upper housing 14 is a float 42 suspended on a lever 44 mounted on a fulcrum 46. The lever is pivoted on the fulcrum 46 by means of a pin 48. Extending upwardly from the wall 32 within the upper housing 14 is a valve support 50 so as to lie in axial spaced relationship with the lever 44. Disposed concentrically within the valve support 50 is a needle valve 52 which is normally closed having a tubular chamber 54 extending from the seat (not shown) of said valve into direct connection with the chamber C. Disposed on the upper surface of the needle valve 52 is an actuating pin 56 which is axially spaced from the lever 44 when the lever is in a horizontal position. The tension on the lever 44 is maintained by a leg spring 58 which bears against the distal end 60 of the lever 44. The tension on the leg spring may be varied by an adjusting screw 62 which extends downwardly from the upper wall 34 of the housing 14 to compensate for slight volumetric changes within the upper housing 14.

In the operation of the device line pressure is constant at A which normally is in a 60–80 p.s.i. range. The line pressure is prevented from passing through the inlet 16 to the outlet 18 by the presence of the baffles 20 and 22 and the valve disc 26. However, line pressure is maintained in the chamber C by the capillary tube 34 so that chamber C is always under line pressure. When the device is in normal operation the upper housing is full of water and the float 42 is maintained in a buoyant position with the lever 44 in axial spaced relationship with the actuating pin 56 so that the needle valve 52 is in a closed position. Since the wall 36 containing the wick 40 is exposed to atmospheric conditions normal evaporation based on the existing evaporative rate will cause a certain amount of liquid to evaporate from the upper housing 14. Over a period of time a quantity of water within the upper housing will evaporate at such a rate and to such a degree that the float 42 will not be supported and will descend downwardly through an arc causing the lever 44 to bear against the top of the actuating pin 56. The float is maintained in a substantially normal position by the spring 58 bearing against the end of the lever so that the operation of the float is not gradual but by causing an abrupt tripping of the needle valve which prevents less frequent filling of the chamber 14 and allows a prolonged watering period. In so doing the actuating pin 56 will open the needle valve 52 allowing the line pressure to be forced upward through the tubular chamber 54 into the upper housing, while simultaneously therewith the drop in the line pressure within chamber C due to the difference in diameter between the tubular chamber 54 and the capillary feed line 34 will reduce the internal pressure in the diaphragm 28, causing the line pressure on the under surface of the disc 26 to overcome the holding spring 30 permitting the valve disc to pop upwardly permitting a flow of water through the valve seat 24 and over the baffle 22 to the outlet which in turn supplies the sprinkling system. Since the capillary tube 34 is of a comparative lessor diameter than the inlet 16, it will require a considerable length of time to allow water to pass upwardly into the upper housing 14. However, the upper housing will gradually accumulate sufficient water to buoyantly support the float 42 which is held in its downward position by the spring 58 until sufficient water has accumulated to trip the float sharply upwards resulting in an abrupt interruption of the water flow by the sudden closing of the needle valve 52, and raises it to its normal level causing the lever 44 to disengage the actuating pin 56 of the needle valve 52 thereby closing the needle valve 52 and allowing the line pressure to build up in chamber C thereby exerting an internal pressure on the diaphragm 28 which in combination with the spring 30 causes the valve disc 26 to seat against the valve seat 24 interrupting the flow of the water from the inlet to the outlet.

A modified form of this invention is shown in FIG. 3 wherein the device consists of a lower housing 12a and an upper housing 14a. The lower housing has a threaded inlet 16a and threaded outlet 18a with the remainder of the body similar to that shown in the basic form. However, the upper housing 14a has a float 42a which is maintained in a buoyant position by liquid contained within the upper housing 14a and is supported by bracket 44a secured to one of the side walls of the housing 14a and pivotable on a pin 46a. A valve support 50a extends upwardly from the lower housing 12a having a tubular chamber 52a in direct connection with a chamber C (not shown), and a needle valve 54a positioned within the valve support 50a being spring tensioned by a spring member 55a. An actuating pin 56a extends upwardly from the needle valve 54a and is in spaced axial relationship with the lower surface of the float 42a when the float is in a buoyant state. An evaporating chamber 58a is disposed adjacent the lower surface of the upper housing 14a and is in direct connection with the interior thereof by means of a tube 60a. Extending downwardly from the bracket 44a is a closure device 62a having its lower surface in lateral spaced relationship with the tube 60a when the float is in a buoyant state. An equalizing tube 64a extends from a point spaced from the upper wall 66a of the housing 14a and in direct connection with the interior of the housing into the evaporating chamber 58a.

In operation the device works similar to the basic form in that line pressure is maintained constant on the inlet A and when the chamber 14a contains sufficient water to maintain the float 42a in a buoyant position no water is allowed to pass from the inlet A to the outlet B. The evaporating chamber is in direct connection with the interior of the upper housing 14a. When the water evaporates from the chamber 58a a corresponding decrease in water level occurs with the housing 14a causing the float 42a to pivot on the pin 46a allowing the bottom of the float to contact the actuating pin 56a overcoming the spring 55a opening the valve 54a permitting a flow of water through the outlet B. The spring 55a maintains the needle valve 54a in the closed position until most of the water in the housing 14a has evaporated so that the needle valve opens abruptly and there is not a gradual flow of water into the housing 14a. With the tilting of the float the closure device 62a is forced into abutting relationship with the tube 60a by means of a spacer 67a preventing water contained within the upper housing 14a from flowing the evaporating chamber 58a until the float has maintained a buoyant state. When the float is in a buoyant state as a result of the build-up of the water level within the upper housing 14a, the needle valve 54a closes and the closure device 62a moves away from the tube 60a permitting the equalizing tube to maintain a proper differential between the evaporating chamber and the interior of the upper housing 14a.

While there have been described herein what are considered preferred embodiments of the invention, it will be obvious to those skilled in the art that modifications and changes may be made therein without departing from the essence of the invention. It is therefore to be understood that the exemplary embodiments are illustrative and are not restrictive of the invention.

I claim:

1. A sprinkler control valve comprising,
    (A) a lower housing having opposed inlet and outlet means,
        (1) said inlet in direct connection with line pressure,
    (B) a valve seat positioned intermediate said inlet and outlet means,
    (C) a disc in axial alignment with said seat,
    (D) a capillary extending through said disc to a pressure chamber providing constant line pressure to said chamber,
    (E) said pressure chamber having a resilient lower surface and a spring member biasing said disc into engagement with the valve seat,
    (F) an upper housing having a float normally buoyantly supported by liquid, said upper housing being open to the atmosphere,
    (G) valve means interposed between said upper housing and the pressure chamber,
    (H) said valve means positioned in spaced relationship to said float and actuated thereby, whereby the action of said float will regulate the height of the liquid within said upper housing.

2. A sprinkler control valve adapted for interposition within a water supply line, consisting of,
    (A) a lower housing containing a valve seat and disc, capillary means extending through said disc constantly maintaining a pressure chamber under line pressure,
    (B) said disc biased into engagement with said seat by a resilient diaphragm and a spring disposed within said pressure chamber,
    (C) an upper housing containing a pivotable float normally buoyantly supported by water, (D) said upper housing being open to atmosphere,
(E) valve means regulating the passage of water from said pressure chamber to said upper housing,
(F) said valve means actuated by the operation of said float.

3. A sprinkler control valve as set forth in claim 2 wherein said float is tensioned by spring means bearing on one end thereof.

References Cited
UNITED STATES PATENTS

| | | | |
|---|---|---|---|
| 2,895,493 | 7/1959 | Edwards | 137—78 |
| 2,965,117 | 12/1960 | Gallacher | 137—78 |
| 3,006,554 | 10/1961 | Harris | 137—78 X |
| 3,244,372 | 4/1966 | Hanner | 137—78 X |

WILLIAM S. BURDEN, *Primary Examiner.*